HENRY J. AMERLING.
Improvement in Nutmeg Graters.
No. 125,428.                              Patented April 9, 1872.
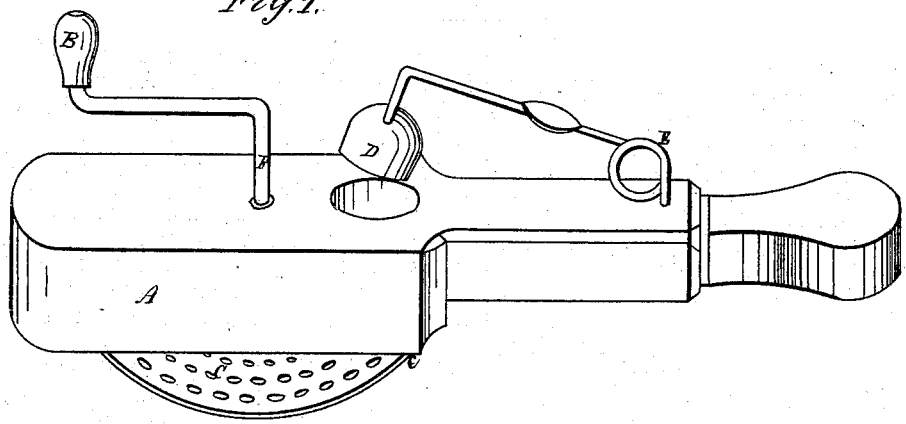
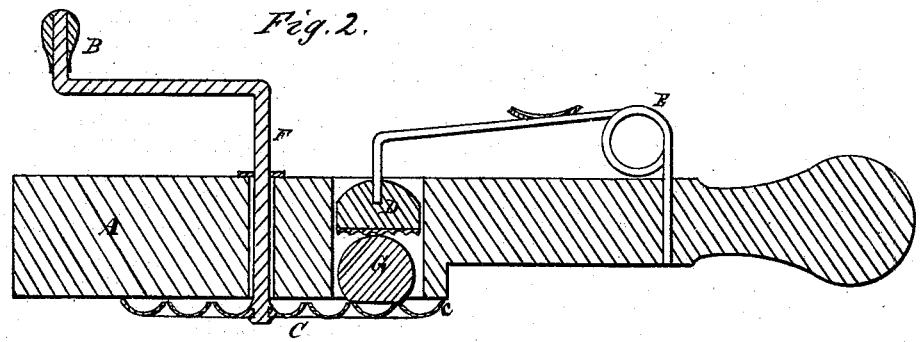
Witnesses:                            Inventor:

UNITED STATES PATENT OFFICE.

HENRY J. AMERLING, OF ERIE, PENNSYLVANIA, ASSIGNOR OF ONE-HALF HIS RIGHT TO HORACE N. SMITH, OF SAME PLACE.

IMPROVEMENT IN NUTMEG-GRATERS.

Specification forming part of Letters Patent No. 125,428, dated April 9, 1872.

*To all whom it may concern:*

Be it known that I, HENRY J. AMERLING, of Erie, in the county of Erie and State of Pennsylvania, have invented a new and Improved Nutmeg-Grater; and I do hereby declare the following to be a full, clear, and exact description of the same, reference being had to the accompanying drawing and the letters of reference marked thereon.

My invention is illustrated in the accompanying drawing as follows: Figure 1 is a perspective view, and Fig. 2 is a sectional view, the line of section being longitudinal.

The device consists of the following parts: The body and handle A, which are made of one piece of wood. C is the grater, which is a circular piece of metal, and is hung on the shaft F, which is journaled through the body A. B is a crank on the shaft F. By this arrangement the grater is revolved, its rough face being next to the wooden body A. To prevent the rough part of the grater from coming in contact with the wood, the periphery of the grater is turned up, forming the rim c. This rim rises above the rough part of the grater and keeps it from wearing the wood. Through the body A and near the handle is an opening, in which is placed the nutmeg G, where it is held down firmly to the face of the grater C by the plunger D, which is operated by the wire spring E.

My device is operated as follows: When not in use, it appears as in Fig. 1, with the plunger D held up by the spring E. The nutmeg is then placed in position, and the operator presses the thumb of the hand which grasps the handle down on the spring. This throws the plunger D against the nutmeg and holds it down against the grater C. The operator, with the unoccupied hand, then revolves the crank B, which, of course, rotates the grater C, which operation grinds or grates the nutmeg.

This device is so simple and every part of it so easy of construction and of such cheap material that it commends itself to all as a cheap, simple, and quickly-manipulated device.

The nutmeg can be held in its place until entirely used up, and the operator is in no danger of rasping off the skin of his fingers.

What I claim as new, and desire to secure by Letters Patent, is as follows:

The crank B, shaft F, and revolving grater C, in combination with the body A, spring E, and plunger D, when the same are arranged and operated as and for the purpose set forth.

HENRY J. AMERLING.

Witnesses:
JNO. K. HALLOCK,
HORACE N. SMITH.